Nov. 3, 1931.  H. E. BUCKLEN ET AL  1,829,888
COLLECTOR AND BEARING ASSEMBLY
Filed Oct. 16, 1926   3 Sheets-Sheet 1

Witnesses:
William P. Kiley
Harry R. LeWhite

Inventors
Herbert E. Bucklen
Harlie O. Patt

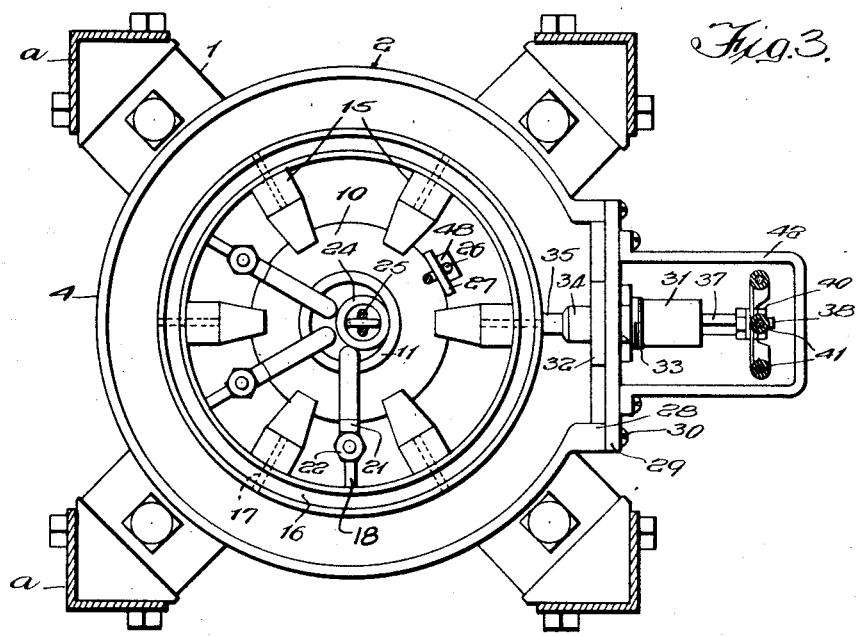

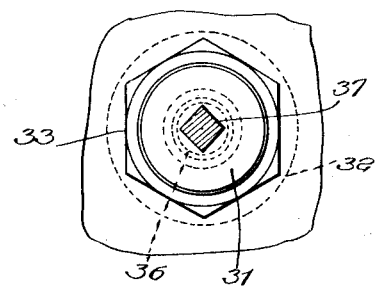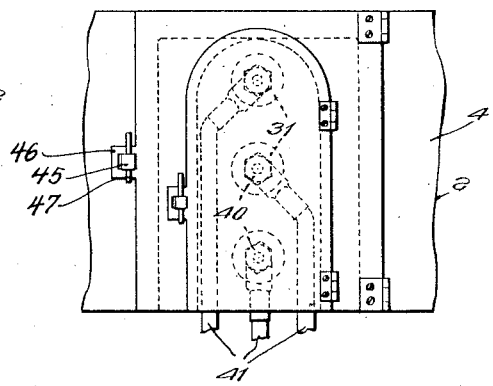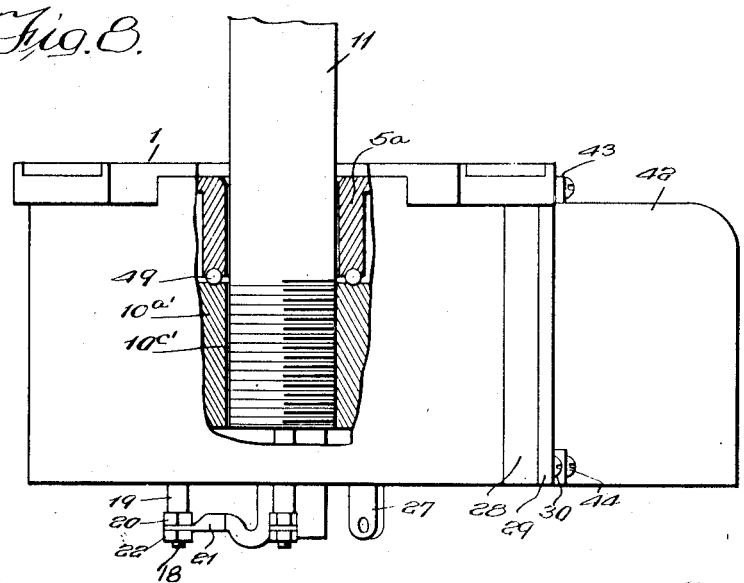

Patented Nov. 3, 1931

1,829,888

UNITED STATES PATENT OFFICE

HERBERT E. BUCKLEN AND HARLIE O. PUTT, OF ELKHART, INDIANA, ASSIGNORS, BY DIRECT AND MESNE ASSIGNMENTS, TO HERBERT E. BUCKLEN CORPORATION, A CORPORATION OF INDIANA

COLLECTOR AND BEARING ASSEMBLY

Application filed October 16, 1926. Serial No. 142,134.

This invention relates to collector and bearing ring assemblies, and more particularly to an assembly of this character adapted for use in connection with wind driven means for generating electricity.

This device is intended for use in connection with a hollow mast or spindle depending from a head mounted upon a tower, the head carrying a wind driven wheel and an electric generator driven by the wheel. Assemblies of this general character have been used for the purpose stated, but such assemblies as are commonly in use are objectionable in that they are unnecessarily cumbersome and do not permit ready access to the collector rings and brushes. In one of the more common forms of assemblies of this character, with which we are familiar, the collector rings are supported by a hood or housing in concentric relation and the brushes are supported by a plate secured on the spindle beneath the housing and forming a closure for the lower portion thereof, the brushes being arranged vertically. This construction is objectionable as it is necessary to make the housing of comparatively great diameter to accommodate the concentric collector rings. It is also objectionable in that dust and gritty substances tend to collect in the housing upon the brushes and rings seriously interfering with proper contact between the same and rapidly wearing away the brushes. Another very serious objection to this form of construction is that it is impossible to obtain access to the brushes and rings for cleaning, repairs and replacement without practically disassembling the whole structure.

One of the primary objects of our invention is to avoid these objections and to provide a structure which occupies a minimum of space and in which ready access can be had to the collector rings and the brushes without the necessity of disassembling to any appreciable extent the structure.

Another important feature of our invention is the mounting of the rings in such position as to be readily accessible when the brush carrying member is detached, these rings being accessible from the side of the housing instead of from underneath the same.

A further important feature of our invention is the manner of supporting the rings so as to produce an openwork supporting structure which will not tend to collect gritty and foreign substances of various sorts which would interfere with operation of the device. Further advantages and objects of our invention will appear from the detail description.

In the drawings:—

Fig. 3 is an underneath view of the assembly as applied;

Fig. 4 is a fragmentary side view;

Fig. 5 is a central vertical sectional view of the hub;

Fig. 6 is a sectional view of the outer portion of one of the brush members, taken adjacent the outer end of the brush housing;

Fig. 7 is a view similar to Fig. 4 showing a modified form of closure member for the housing; and Fig. 8 is an elevation partly broken away and in section to show a modified form of bearings.

Figure 1:
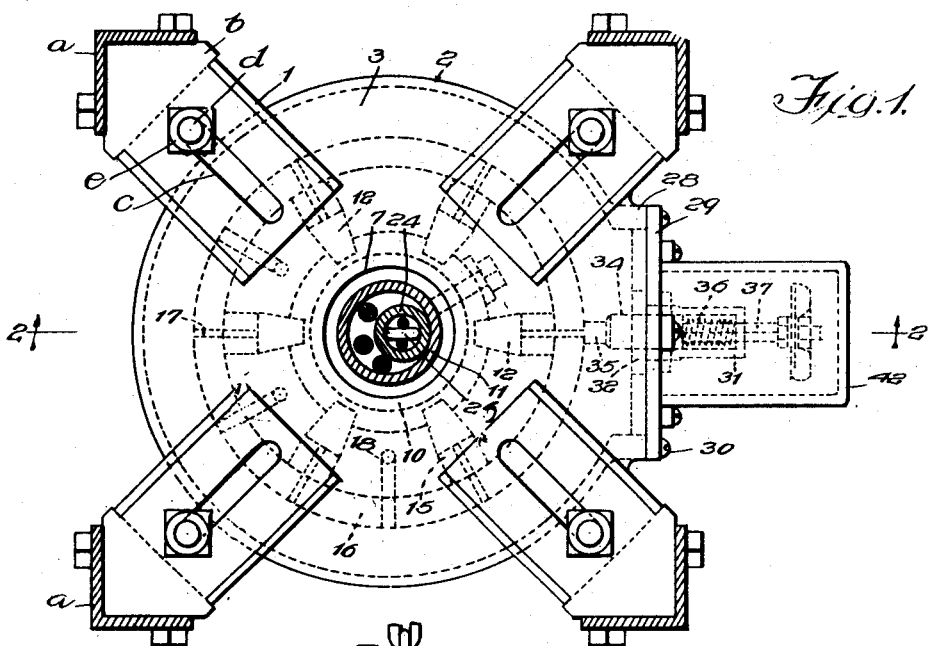
Fig. 1 is a plan view of the collector and bearing assembly as applied.

The device is intended to be used in connection with a suitable tower including corner supports or uprights $a$ of angle cross section to which are secured brackets $b$ provided with longitudinally extending slots $c$ which receive bolts $d$ on the upper ends of which are threaded nuts $e$. The brackets $b$ fit into channel elements 1 on the top of the housing 2, the bolts $d$ passing through openings provided in such elements. The housing is thus supported so as to be readily adjusted and accurately centered relative to the tower.

The housing 2 includes a top plate 3 having a depending peripheral flange 4 of appreciable depth and forming with the plate or wall 3 a housing of inverted cup shape. A neck 5 depends from wall 3 and has its lower portion of increased interior diameter to form a recess for reception of a bearing sleeve 6, and a shoulder 7, adjacent the upper end of the neck with which the upper end of the sleeve contacts. The lower end of sleeve 6 is beveled at 8 and contacts with a similar beveled bearing surface 9 formed at the upper end of a hub member 10 threaded upon the lower end of a hollow spindle 11. This spindle extends through the bearing sleeve and, in practice, is secured to the head mounted on the top of the tower for rotation therewith. As will be noted more clearly from Fig. 5, hub 10 is provided with an interiorly reduced and threaded portion 10A which is threaded upon the spindle, the upper portion 10B of the hub being of slightly increased interior diameter. The interior diameter of neck 5 and sleeve 6 is greater, in each instance, than the exterior diameter of spindle 11, leaving a slight space about the spindle. The interior diameter of portion 10B of hub 10 is the same as the interior diameter of sleeve 6 and the hub is provided with drainage grooves 10C extending through the threaded portion 10A thereof. This provides simple and efficient means whereby moisture which collects upon the upper surface of the housing can be readily drained off around the spindle. It will also be noted that, during dry weather, free circulation of air is permitted through the hub and about the spindle so as to quickly evaporate and dissipate any moisture which might tend to collect about the spindle and associated parts. In this manner, we very effectually prevent the collection of moisture in the assembly which is an important consideration.

The hub 10 is provided at each end with a plurality of longitudinally extending arms 12 which are arranged in pairs aligned longitudinally of the hub, and each of these arms is provided at its outer end with a lug 13, which is disposed radially of the hub, these lugs being suitably bored and threaded for reception of securing screws 14 by means of which vertically disposed insulating strips 15 are secured to the lugs. After the strips have been thus secured in position, the hub and associated parts are mounted in a lathe and the outer surfaces of the insulating strips are turned so as to be concentric with the hub. After this has been done, the collector rings 16 are mounted upon the strips 15 and spaced apart equi-distantly thereon, these rings being secured in position by dowel pins 17 or in any other suitable or preferred manner. The hub assembly may then be placed in a lathe a second time and the outer faces of the rings 16 dressed though ordinarily this is not essential. The rings 16 are, of course, formed of suitable material of high electrical conductivity such as copper, phospher-bronze, or other suitable or preferred material ordinarily used for such purposes. Each ring is provided with a terminal stud 18 secured at its upper end to the ring and disposed substantially at right angles thereto, the body portion of the stud being arranged substantially vertically. Preferably, though not necessarily, a tube 19 of insulating material is arranged about each terminal stud and is confined between the upper end thereof and a nut 20 threaded onto the stud. A terminal lug 21 is clamped between nut 20 and a nut 22 threaded onto the stud below the lugs. The lugs 21 are connected by insulated wires 23 to the opposite sides of an electric generator supported upon the head at the top of the tower, and to the field of the generator, in a known manner. The conductor 23 extends downwardly through the spindle 11 adjacent a pipe or tube 24 which also extends through the spindle and provides a housing for a pull-out chain 25 connected to a tail or vane associated with the head at the top of the tower for throwing the wind wheel into and out of the wind in a known manner. The lower end of this chain is connected to the lower end of the compensator spring 26, to upper end of which may be secured through a finger 27 depending from the hub.

Figure 2:
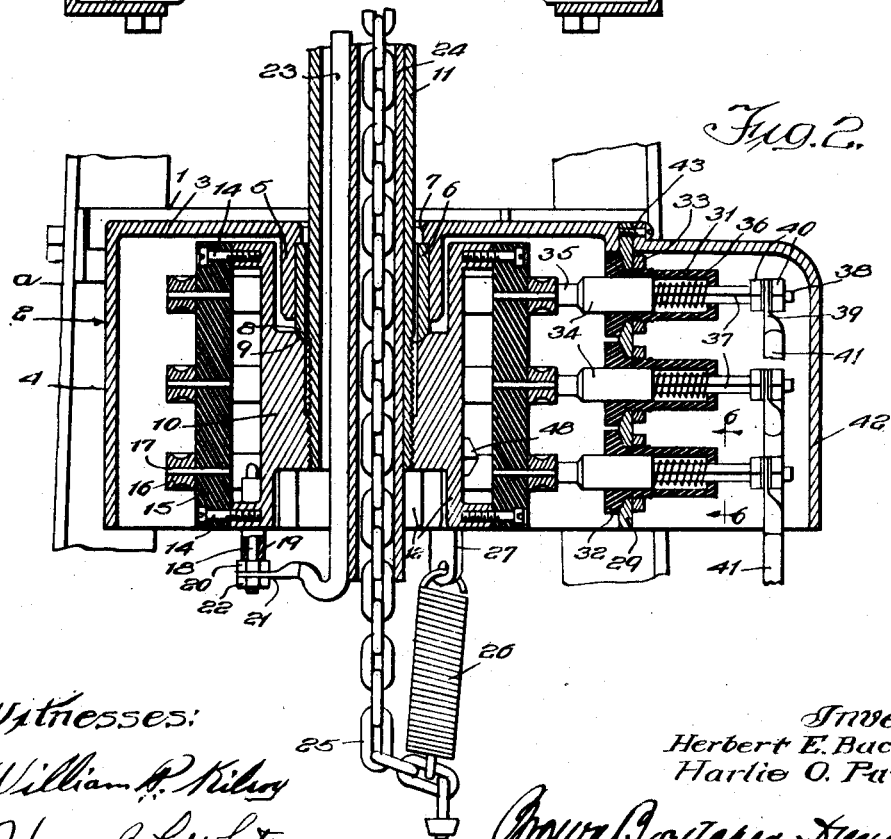
Fig. 2 is a section taken substantially on line 2—2 of Fig. 1.

The housing 2 is provided with a substantially radially disposed rectangular offset 28, the outer end of which is normally closed by a plate 29 detachably secured to the housing by screws 30, or in any other suitable or preferred manner. This plate is provided with openings for reception of brush housings 31 of electrical insulating material, each of these housings being provided at its inner end with an annular flange 32 having its outer face beveled or inclined for contact with a similarly inclined surface of the plate 29 surrounding each of the brush housing openings. The housing 31 is secured in position by a ring 33 threaded thereon and bearing against the outer face of plate 29. A brush 34 is slidably mounted in housing 31, the tip 35 of this brush being held in contact with its cooperating ring 16 by an expansion coil spring 36 mounted about the reduced stem 37 of the brush and confined between the body portion 34 of the brush and the outer end of the brush housing 31. As will be noted more clearly from Fig. 6, stem 37 is square in cross section and fits snugly through a similarly shaped opening in the outer end of the housing 31. This serves to effectually prevent turning of the brush in the housing. The outer end portion of stem 37 is reduced and threaded to provide a screw stud 38 which receives a terminal lug 39 secured between nuts 40 which are threaded tightly onto the stud. Suitably insulated wires 41 are connected to the brushes by means of the terminal lugs 39 secured on these wires, and these wires are connected to the positive and negative sides of a storage battery and suitable controlling means associated therewith, in a known manner. The brush housings, together with the terminal lugs 39 and associated parts, are protected by a cover member 42 of approximately U-shape in cross section and closed at its upper end, this member being open at its lower end to accommodate the wires or conductors 41. This cover member is provided, at the top and each side thereof with suitable ears 43 through which pass securing screws 44 threaded into the closure plate 29. By removing these screws, ready access can be had to the terminal lugs and the outer portions of the stems of the brushes, for securing the lugs tightly in position at different angles to readily accommodate the wires 41 in the cover 42, as will be clear from Figs. 4 and 2.

In Fig. 7, we have shown a modified form in which the closure plate 29 is hingedly secured at one end to the housing 2, and is detachably secured at its other end or side to the housing by means of a suitable stud 45 extending from the housing through an eye 46 on the plate, a tapered pin 47 being inserted through the stud and bearing against the eye, the cover member 42 being similarly secured on the plate.

It will be noted that, by arranging the collector rings 16 in vertical alignment, the housing 2 can be of much less diameter than would be possible if these rings were disposed in a common horizontal plane in concentric relation. This renders it possible to position the assembly nearer the top or head of the tower than would otherwise be possible, so that the length of the spindle 11 can be reduced over the length of spindles now commonly in use where this seems desirable or necessary. By removing the closure member or plate 29 from over the outer end of the offset 28, the collector rings 16 are exposed and are readily accessible for cleaning, repairs or replacements. It will also be noted that the movement of the plate 29 from over the outer end of the offset 28 exposes the brushes 34 and parts associated therewith so that these brushes are readily accessible also for cleaning or repairs. The plate 29 and parts carried thereby thus constitute a unit which can be readily applied to or detached from the housing without necessitating in any way disassembling of the general assembly while permitting ready access to the collector rings as well as the brushes and associated parts. It will also be noted that the collector rings are supported in spaced relation to the hub and the insulating strips 15 are spaced an appreciable distance apart thus providing an openwork supporting structure for the rings and permitting ready access to the same for the removal or cleaning out of any foreign materials. In view of the fact that the lower end of the housing 2 is open and the ring supporting structure is of openwork construction, the tendency for gritty foreign material to collect within the assembly is reduced to a minimum. It also is to be noted that the contacting surfaces of the rings 16, as well as the contacting surfaces of the brushes 34, are disposed vertically so that there is no decided tendency for gritty and foreign materials to collect between the rings and the brushes such as frequently occurs where the brushes and the rings are disposed in vertical position with their contacting surfaces horizontal.

As the housing 2 is fixed, any end thrust or play vertically of the spindle 11 can be overcome by threading the hub 10 onto the lower end of the spindle into contact with the lower end of the bearing sleeve 6. The hub may be secured against reverse rotation on the spindle in any suitable or preferred manner as by means of a set screw 48 threaded through the hub and bearing against the spindle. This set screw also provides means for supporting the finger or plate 27 to which the upper end of the compensator spring 26 is secured.

In Fig. 8, we have illustrated a modified form in which the bearing sleeve 6 is omitted, the lower end of neck 5A being provided with a ball channel which receives the bearing balls 49 seating in a corresponding groove or channel provided at the upper end of the hub member 10A. The neck 5A is of slightly greater interior diameter than the exterior diameter of spindle 11 and the hum member 10A' is provided with drainage grooves 10C'. In all other respects, the construction illustrated in Fig. 8 is similar to that illustrated in Fig. 2.

What we claim is:—

1. In a device of the character described, a fixed housing, a hollow spindle rotatably mounted in the housing, a hub secured on the spindle within the housing and provided with a plurality of radially disposed lugs arranged in vertically aligned pairs insulating strips secured to respective pairs of lugs, collector rings mounted on the outer faces of the strips and spaced apart vertically, and brushes carried by the housing and contacting with said rings.

2. In a device of the character described, a fixed housing, a hollow spindle rotatably mounted in the housing, a hub secured on the spindle within the housing and provided with a plurality of radially disposed lugs arranged in vertically aligned pairs, insulating strips secured to the respective pair of lugs, collector rings mounted on the outer faces of the strips and spaced apart vertically, the housing being provided in its peripheral wall with an opening giving access to the rings, a closure plate for said opening detachably secured to the housing, and brushes carried by said plate and contacting with the rings.

3. In a device of the character described, a fixed housing having a neck depending from its top wall, the lower portion of the neck being of enlarged interior diameter to form an annular recess and a shoulder at the upper end thereof, a hollow spindle extending through the neck, a hub secured on the spindle, a bearing sleeve mounted in said recess and confined between the shoulder and the hub, the hub and the sleeve having cooperating means holding the hub in concentric relation to the neck, and cooperating collector rings and brushes carried by the hub and the housing.

4. In a device of the character described, a fixed housing having a neck depending from its top wall, the lower portion of the neck being of enlarged interior diameter to form an annular recess and a shoulder at the upper end thereof, a hollow spindle extending through the neck, a hub secured on the spindle, a bearing sleeve mounted in said recess and confined between the shoulder and the hub, the hub and the sleeve having cooperating means holding the hub in concentric relation to the neck, and cooperating collector rings and brushes carried by the hub and the housing, said neck and the sleeve being spaced away from the spindle, and the hub having drainage openings extending the full length of its inner face.

In witness whereof, we hereunto subscribe our names this 13th day of October, 1926.

HERBERT E. BUCKLEN.
HARLIE O. PUTT.